United States Patent
Sato et al.

(10) Patent No.: US 10,279,639 B2
(45) Date of Patent: May 7, 2019

(54) AMPHIBIOUS VEHICLE

(71) Applicant: MITSUBISHI HEAVY INDUSTRIES, LTD., Tokyo (JP)

(72) Inventors: Shinichi Sato, Tokyo (JP); Mitsuo Onoue, Tokyo (JP); Takashi Matsunaga, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/557,984

(22) PCT Filed: Jan. 12, 2016

(86) PCT No.: PCT/JP2016/050646
§ 371 (c)(1),
(2) Date: Sep. 13, 2017

(87) PCT Pub. No.: WO2016/147685
PCT Pub. Date: Sep. 22, 2016

(65) Prior Publication Data
US 2018/0079268 A1 Mar. 22, 2018

(30) Foreign Application Priority Data
Mar. 19, 2015 (JP) .................................. 2015-056031

(51) Int. Cl.
*B60F 3/00* (2006.01)
*B63H 11/08* (2006.01)

(52) U.S. Cl.
CPC ............. *B60F 3/0053* (2013.01); *B60F 3/00* (2013.01); *B60F 3/0015* (2013.01); *B63H 11/08* (2013.01); *B63H 2011/081* (2013.01)

(58) Field of Classification Search
CPC combination set(s) only.
See application file for complete search history.

(56) References Cited

U.S. PATENT DOCUMENTS

| 4,730,664 A | * | 3/1988 | Forsthuber | ............ | B60F 3/0053 |
| | | | | | 123/41.02 |
| 5,417,177 A | * | 5/1995 | Taguchi | ................ | B60F 3/0053 |
| | | | | | 165/44 |

(Continued)

FOREIGN PATENT DOCUMENTS

| JP | 47-4175 Y | 2/1972 |
| JP | 2006-509138 A | 3/2006 |

(Continued)

OTHER PUBLICATIONS

International Preliminary Report on Patentability dated Jul. 4, 2017 issued in Application No. PCT/JP2016/050646 with an English translation.

(Continued)

*Primary Examiner* — Ajay Vasudeva
(74) *Attorney, Agent, or Firm* — Birch, Stewart, Kolasch & Birch, LLP (57) ABSTRACT

An amphibious vehicle according to the present invention includes a vehicle body, a traveling portion which causes the vehicle body to travel on land, a propulsion portion which causes the vehicle body to travel on water, a power portion which provides power to the traveling portion and the propulsion portion, and a cooling portion which cools the power portion. The cooling portion includes a first cooling source introducing portion which takes in air from the outside and a second cooling source introducing portion which takes in water from the outside. The second cooling source introducing portion includes an opening which takes in water. The opening is opened on a rear side of a center of gravity of the entire vehicle body and in a draft portion in an outer surface of the vehicle body.

5 Claims, 4 Drawing Sheets (56) References Cited

U.S. PATENT DOCUMENTS

| | | | | |
|---|---|---|---|---|
| 5,690,046 A | * | 11/1997 | Grzech, Jr. | B60F 3/0053 440/12.5 |
| 7,581,582 B2 | * | 9/2009 | Longdill | B60F 3/0053 165/41 |
| 7,666,041 B2 | * | 2/2010 | Gibbs | B60F 3/0053 440/88 C |
| 7,856,810 B2 | * | 12/2010 | Longdill | B60F 3/0053 60/298 |
| 2005/0272324 A1 | | 12/2005 | Gibbs | |
| 2007/0119157 A1 | | 5/2007 | Longdill et al. | |

FOREIGN PATENT DOCUMENTS

| | | |
|---|---|---|
| JP | 2008-521680 A | 6/2008 |
| JP | 2013-132995 A | 7/2013 |
| JP | 2013-136289 A | 7/2013 |

OTHER PUBLICATIONS

International Search Report dated Mar. 15, 2016 issued in Application No. PCT/JP2016/050646 with an English translation.

\* cited by examiner

FIG. 7

AMPHIBIOUS VEHICLE

TECHNICAL FIELD

The present invention relates to an amphibious vehicle.

Priority is claimed on Japanese Patent Application No. 2015-056031, filed Mar. 19, 2015, the content of which is incorporated herein by reference.

BACKGROUND ART

An amphibious vehicle includes, for example, an engine that serves as a power source, a power transmission means for transmitting a driving force from the engine, a land traveling means, and a water traveling means. The power transmission means is propeller shaft or the like which transmits a driving force from the engine. The land traveling means is a wheel, a crawler belt, or the like driven by the driving force transmitted from the engine via the power transmission means. The water traveling means is a water jet mechanism, a screw, or the like driven by the driving force of the engine switched from the land traveling means.

In an amphibious vehicle, when a water jet mechanism is employed as the water traveling means, the amphibious vehicle travels (glides) on water at a high speed by propulsive force of the water jet from the water jet mechanism. In addition, when the water jet mechanism is employed as the water traveling means, when moving onto land from water, it is possible to smoothly shift to ground travel (self-run) by switching to the driving of the land traveling means.

A hull (vehicle body) of an amphibious vehicle disclosed in Patent Document 1 has a double bottom structure including a first ship bottom and a second ship bottom. In this amphibious vehicle, gear boxes such as a propeller shaft and a differential gear are installed in a space between the first ship bottom and the second ship bottom. The space is open at the front surface and rear surface of the hull.

An amphibious vehicle disclosed in Patent Document 2 includes a vehicle body, a water jet mechanism, and a water-cooled heat exchanger. The water jet mechanism includes a water jet channel and a propeller which has an impeller and a shaft. The water jet channel includes an inlet formed in a bottom surface of the vehicle body and an outlet formed in a rear surface of the vehicle body. The impeller of the propeller is provided in the water jet channel. The shaft of the propeller transmits the driving force of the engine to the impeller. The impeller is driven by the power of the engine, and takes in water from the inlet and discharges the water as a water jet from the outlet when traveling on water.

The amphibious vehicle in Patent Document 2 includes a cooling water passage for sending water to a water-cooled heat exchanger. The cooling water passage includes a cooling intake port which is open on the outlet side of the impeller in the water jet channel. In this amphibious vehicle, water from the cooling water passage, engine cooling water, hydraulic oil, or the like is cooled by a water-cooled heat exchanger.

CITATION LIST

Patent Document

[Patent Document 1]
  Japanese Unexamined Patent Application, First Publication No. 2013-136289

[Patent Document 1]
  Japanese Unexamined Patent Application, First Publication No. 2013-132995

SUMMARY OF INVENTION

Technical Problem

An amphibious vehicle travels on water and travels on land. In addition, the amphibious vehicle may move from water to land. As described above, the amphibious vehicle has various modes as movement modes. Therefore, it is preferable that a power portion in each movement mode be stably cooled in the amphibious vehicle.

An object of the present invention is to provide an amphibious vehicle in which a power portion is stably cooled.

Solution to Problem

An amphibious vehicle according to a first aspect of the invention for achieving the above-described object includes a vehicle body, a traveling portion which causes the vehicle body to travel on land, a propulsion portion which generates a propulsive force in water and causes the vehicle body to travel on water, a power portion which provides power to the traveling portion and the propulsion portion, and a cooling portion which cools at least the power portion, wherein the cooling portion includes a first cooling source introducing portion which takes in air from the outside as a cooling source and a second cooling source introducing portion which takes in water from the outside as a cooling source, and the second cooling source introducing portion includes an opening which takes in water and the opening is open on a rear side of a center of gravity of the entire vehicle body and in a draft portion in an outer surface of the vehicle body.

When the amphibious vehicle travels on water and high power is required, water is taken in from the second cooling source introducing portion of the cooling portion and the power portion or the like can be cooled using the water as a cooling source.

In the amphibious vehicle, the opening which takes in water of the second cooling source introducing portion is provided on the rear side of the center of gravity of the entire vehicle body and in the draft portion in the outer surface of the vehicle body. Therefore, when the amphibious vehicle moves to land, even if the vehicle body assumes an inclined posture in which the front portion is disposed upward and the lower portion is disposed downward, the opening can be disposed in water, that is, the opening can be disposed in water for a long time (for example, until the end) and continue to take in water. Therefore, when the amphibious vehicle moves to land, even if the vehicle body assumes such an inclined posture as described above, it is possible to effectively cool the power portion or the like using the water taken from the second cooling source introducing portion as the cooling source.

An amphibious vehicle according to a second aspect of the invention for achieving the above-described object is configured, in the amphibious vehicle of the first aspect, such that the propulsion portion is a water jet mechanism which generates a water jet as a propulsive force, the water jet mechanism includes a water jet channel through which water flows and an impeller disposed in the water jet channel and configured to rotate with power from the power portion, the water jet channel includes an inlet port which takes in water from the outside, and the inlet port of the water jet channel and the opening of the second cooling source introducing portion are disposed at different positions in an outer surface of the vehicle body and the second cooling source introducing portion is an independent passage from the water jet channel.

In the amphibious vehicle, corrosion may occur due to salinity of seawater when it travels on the sea. For this reason, it is necessary to clean the amphibious vehicle by using cleaning water such as fresh water on land after traveling on the sea. In the amphibious vehicle, since the second cooling source introducing portion is an independent passage from the water jet channel, it is possible to easily supply a cleaning solution into the second cooling source introducing portion without causing disturbance to the impeller in the water jet channel. For example, it is possible to send a jet stream of the cleaning solution to the back of the second cooling source introducing portion. Therefore, in the amphibious vehicle, it is possible to easily clean the inside of the second cooling source introducing portion with a cleaning solution.

An amphibious vehicle according to a third aspect of the invention for achieving the above-described object is configured, in the amphibious vehicle of the first or second aspect, such that the opening of the second cooling source introducing portion is disposed to be exposed in a side view or rear view of the vehicle body.

In the amphibious vehicle, it is possible to easily supply the cleaning solution into the second cooling source introducing portion compared to a case in which the opening of the second cooling source introducing portion is disposed in the bottom surface of the vehicle body.

An amphibious vehicle according to a fourth aspect of the invention for achieving above-described object is configured, in the amphibious vehicle in any one of the first to third aspects, such that the opening of the second cooling source introducing portion is provided in a range of the rearmost ¼ of the entire length direction of the vehicle body.

An amphibious vehicle according to a fifth aspect of the invention for achieving the above-described object is configured, in the amphibious vehicle in any one of the first to fourth aspects, such that the traveling portion includes a plurality of wheels, and the opening of the second cooling source introducing portion is disposed on a rear side of the rearmost wheel.

An amphibious vehicle according to a sixth aspect of the invention for achieving the above-described object is configured such that the traveling portion includes a plurality of wheels having a drive wheel and a driven wheel, a crawler belt wound around the plurality of wheels, and a movable support arm which supports at least a part of the plurality of wheels to be movable in a vertical direction, the movable support arm is displaceable between a first state in which at least a part of the wheels is supported in a first position in a vertical direction and a second state in which at least a part of the wheels is supported in a second position which is on an upper side relative to the first position with respect to the vehicle body, and the opening of the second cooling source introducing portion is disposed at a position which is closed by the movable support arm when the movable support arm is in the first state and at a position which is not closed by the movable support arm when the movable support arm is in the second state.

Further, in the amphibious vehicle of the sixth aspect, during opening and closing of the opening of the second cooling source introducing portion by the movable support arm, the movable support arm may not tightly close the opening. That is, in a state in which the opening of the second cooling source introducing portion is closed by the movable support arm of the amphibious vehicle of the sixth aspect, not only a state in which foreign matter such as earth and sand does not enter the opening due to obstruction of the movable support arm but also a state in which it cannot easily enter the opening is included. Therefore, there may be a gap between the movable support arm and the opening.

Advantageous Effects of the Invention

According to one aspect of the present invention, a power portion can be stably cooled.

DESCRIPTION OF EMBODIMENTS

An amphibious vehicle of an embodiment according to the present invention will be described with reference to FIGS. 1 to 7.

An amphibious vehicle of the present embodiment is capable of traveling on water by driving a propeller using an engine and capable of traveling on land by rotating drive wheels using an engine.

Figure 1:
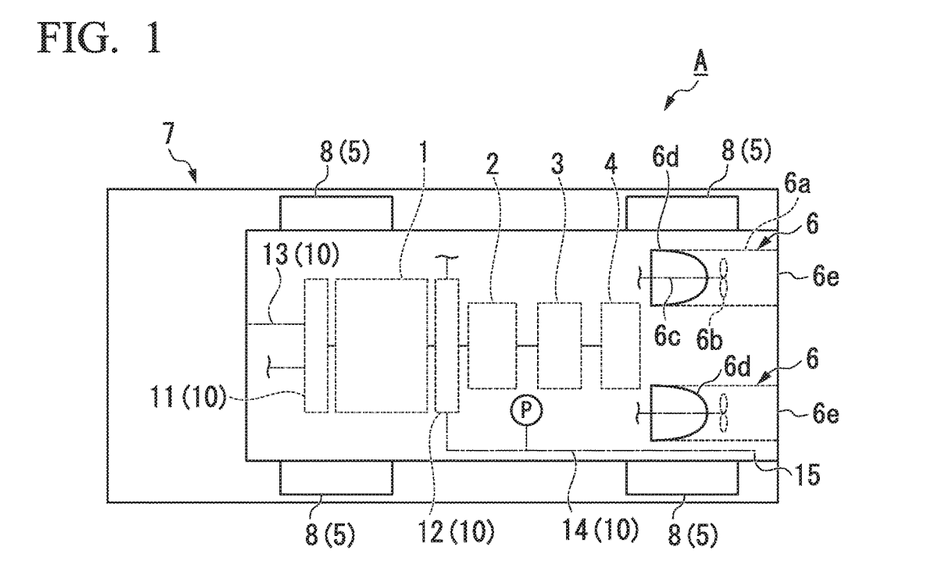
FIG. 1 is a bottom view of an amphibious vehicle of one embodiment according to the present invention.
Figure 2:
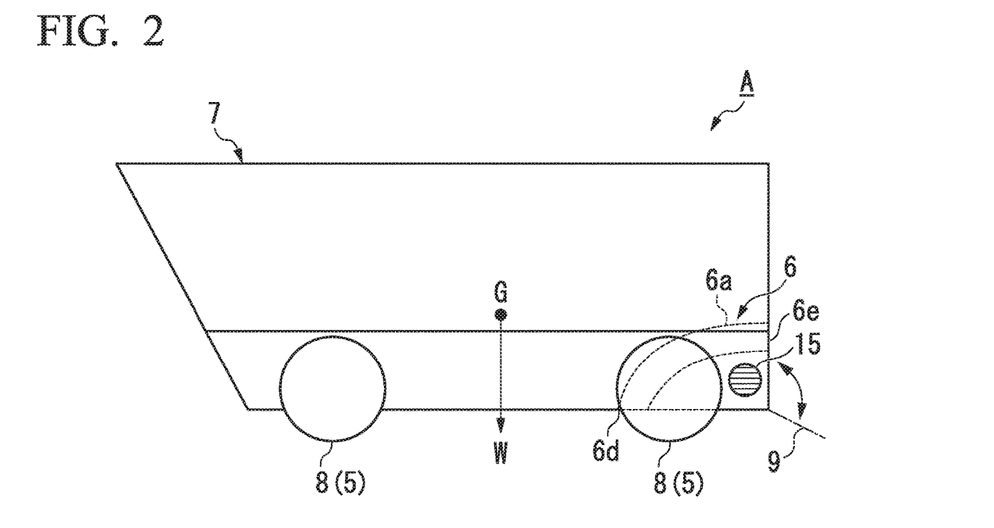
FIG. 2 is a side view of an amphibious vehicle of one embodiment according of the present invention.

Specifically, as shown in FIGS. 1 and 2, an amphibious vehicle A of the present embodiment includes a vehicle body 7 and a power transmission drive system mounted in the vehicle body 7. The power transmission drive system includes, for example, an engine 1 such as a diesel engine serving as a power portion, a transmission 2, a power distribution mechanism 3, a differential device 4, a traveling portion 5 for traveling on land, and a propulsion portion 6 which generates a propulsive force in water for traveling on water.

The vehicle body 7 is configured to have a desired waterproof characteristic so that it is not submerged when traveling on water.

The transmission 2 is a manual transmission or an automatic transmission. The transmission 2 includes an input shaft connected to an output shaft of the engine 1 and provided to be rotatable integrally therewith, and an output shaft which transmits power to the power distribution mechanism 3. The transmission 2 changes power input from the input shaft at a desired gear ratio and transmits it to the output shaft.

The power distribution mechanism 3 is constituted by, for example, a planetary gear mechanism, and distributes input rotational power to the differential device 4 and/or the propulsion portion 6.

The differential device 4 is connected to the power distribution mechanism 3 and transmits the power transmitted from the power distribution mechanism 3 to drive wheels 8 of the traveling portion 5 via an axle. The differential device 4 causes a difference in rotation between the drive wheel 8 on a turning inner side and the drive wheel 8 on a turning outer side at the time of turning of the amphibious vehicle A traveling on land to enable smooth turning travel.

The traveling portion 5 of the present embodiment includes an axle through which power from the power distribution mechanism 3 is transmitted and the drive wheels (tires) 8 connected to the axle. The amphibious vehicle A of the present embodiment can self-run with the drive wheels 8 in contact with the ground when traveling on land.

Here, in the present embodiment, the traveling portion 5 is a wheel type in which tires are provided as drive wheels, but a crawler type (tracked type) may also be used. Also, when the traveling portion 5 of the crawler type is employed as above, the differential device 4 is unnecessary.

The propulsion portion 6 is provided on a rear side in the vehicle body 7 (a part on a rear side of the center of gravity in an entire length direction (length direction) of the amphibious vehicle A, a stern).

The propulsion portion 6 of the present embodiment is a water jet mechanism and includes a water jet channel 6a, an impeller 6b provided in the water jet channel 6a, and a propelling shaft 6c connected to the impeller 6b. The propelling shaft 6c is connected to the power distribution mechanism 3. The impeller 6b is rotated by power transmitted from the power distribution mechanism 3 via the propelling shaft.

Also, the water jet channel 6a includes an inlet port 6d which takes in water and an ejection port 6e for ejecting the taken-in water. The inlet port 6d is formed in a draft portion that is submerged in water at the time of traveling on water in the vehicle body 7. The ejection port 6e is formed on a lower side of a rear surface of the vehicle body 7.

In the propulsion portion 6 of the present embodiment, when rotational power is transmitted from the power distribution mechanism 3 to the propelling shaft 6e and the propelling shaft 6c rotates around the axis, the impeller 6b rotates. When the impeller 6b rotates, water is taken into the water jet channel 6a from the inlet port 6d, the water is pressurized by the impeller 6b and flows through the water jet channel 6a, and the water is jetted from the ejection port 6e toward a rear of the vehicle body 7 as a water jet. The amphibious vehicle A can travel on water by using the water jet generated in such a manner as a propulsive force. In addition, since the water jet is used as the propulsive force, it is also possible for the amphibious vehicle A to perform high-speed travel on water.

When the amphibious vehicle A travels on water with the water jet jetted from the ejection port 6e as the propulsive force, a flap 9 for adjusting a trim angle of the amphibious vehicle A is attached to a rear portion of the vehicle body 7 as necessary.

In the present embodiment, the water jet mechanism is used as the propulsion portion 6 for traveling on water. However, instead of the water jet mechanism, for example, a screw propeller may be used as the propulsion portion and a water flow generated by rotation of the screw propeller may be used as the propulsive force. In other words, the propulsion portion may be of any type as long as it generates water power for traveling on water.

The amphibious vehicle A of the present embodiment further includes a cooling portion 10 which cools at least the engine 1. The cooling portion 10 of the present embodiment includes an air-cooled type cooler 11, a water-cooled type cooler 12, a first cooling source introducing portion 13 which takes in air from the outside and supplies the air to the air-cooled type cooler 11, and a second cooling source introducing portion 14 which takes in water from the outside and supplies the water to the water-cooled type cooler 12. The air-cooled type cooler 11 cools objects to be cooled such as engine cooling water, engine suctioned air, and hydraulic oil by using air as a refrigerant. The water-cooled type cooler 12 uses water (cooling water) as a refrigerant to cool the above-mentioned objects to be cooled.

In the present embodiment, external air is introduced into the inside from the first cooling source introducing portion 13 and the air is sent to the air-cooled type cooler 11 at the time of traveling on land (traveling on water, and moving to land). The air-cooled type cooler 11 uses air as a refrigerant to cool the objects to be cooled including the engine 1.

Figure 7:
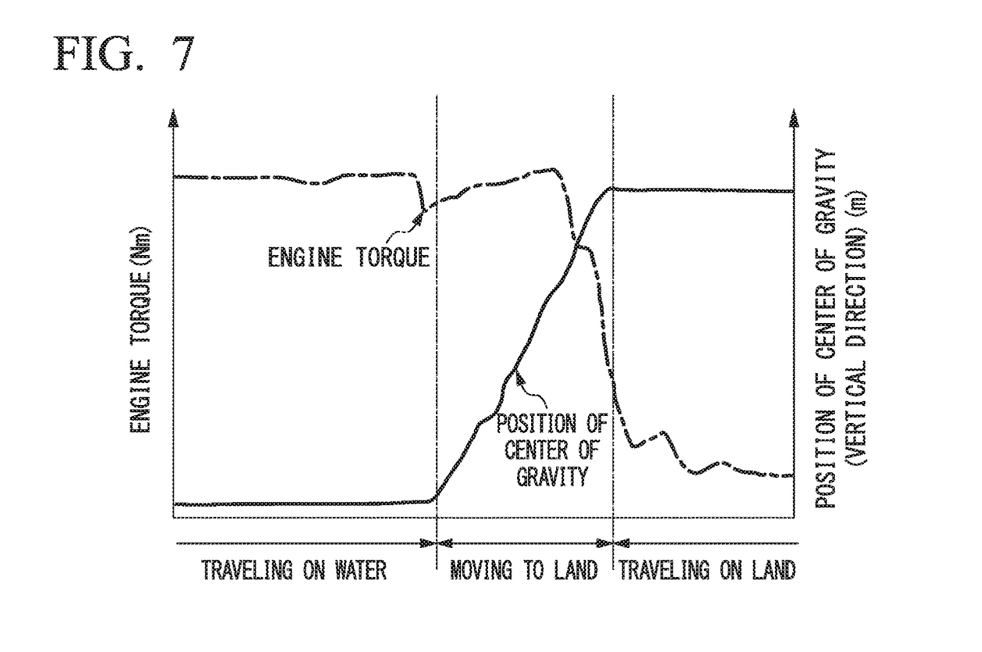
FIG. 7 is a view showing a change in engine torque and position of the center of gravity of an amphibious vehicle when traveling on water, moving to land, and traveling on land.

Here, as shown in FIG. 7, in the amphibious vehicle A of the present embodiment, an engine torque at the time of high-speed traveling on water is greater than an engine torque at the time of traveling on land. Also, when moving from water to land, a position of the center of gravity of the amphibious vehicle A gradually rises. Further, when moving to land, it is necessary to drive the propulsion portion 6 together with the traveling portion 5. Therefore, even when the amphibious vehicle A does not move at a high speed in a horizontal direction, the engine torque of the amphibious vehicle A at the time of moving to land is greater than the engine torque at the time of traveling on land.

Therefore, in the amphibious vehicle A of the present embodiment, it is necessary to increase output of the engine 1 at the time of high-speed traveling on water or at the time of moving to land.

Therefore, in the present embodiment, water is introduced into the inside from the second cooling source introducing portion 14 and the water is sent to the water-cooled type cooler 12 not only at the time of traveling on water but also at the time of moving to land. The water-cooled type cooler 12 cools the object to be cooled including the engine 1 by using water having a large specific heat as a refrigerant.

On the other hand, since output of the engine 1 at the time of traveling on land is less than the output at the time of traveling on water or moving to land, it is possible to sufficiently cool the object to be cooled with only the air-cooled type cooler which uses air as a refrigerant.

Figure 3:
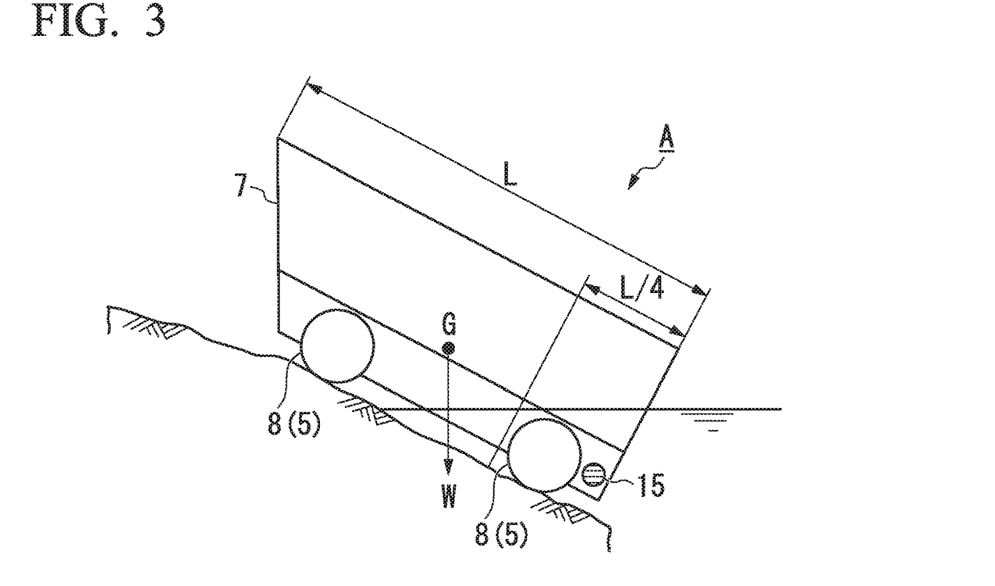
FIG. 3 is a view showing a state of an amphibious vehicle when moving to land in one embodiment according to the present invention.

In the amphibious vehicle A of the present embodiment, as shown in FIGS. 1 to 3, an opening (intake port) 15 which takes in water of the second cooling source introducing portion 14 is open on a rear side of the center of gravity G of the entire vehicle body 7 (the entire amphibious vehicle A) and in a draft portion of the outer surface of the vehicle body 7. Here, the draft portion refers to a portion submerged in water in the vehicle body 7 at the time of traveling on water in a state in which the amphibious vehicle A is in the lightest condition, that is, in a state in which nothing is loaded on the amphibious vehicle A.

Even when the amphibious vehicle A assumes a posture in which the front portion is inclined upward and the lower portion is inclined downward, the opening 15 of the second cooling source introducing portion 14 is disposed in water for a long time. Therefore, in the amphibious vehicle A of the present embodiment, the engine 1 or the like can be continuously cooled with water having a large specific heat by taking in water from the opening 15 and continuously sending the water to the water-cooled type cooler 12.

Also, in the amphibious vehicle A of the present embodiment, it is preferable that the opening 15 of the second cooling source introducing portion 14 be disposed in a range of the rearmost ¼ of the entire length L direction of the vehicle body 7. Here, the range of the rearmost ¼ of the entire length L direction refers to a range from the rear end of the vehicle body toward the front side to a position at a distance of ¼ of the entire length L of the vehicle body. Further, it is preferable that the opening 15 of the second cooling source introducing portion 14 be disposed on a rear side of the rearmost wheel 8.

With such a configuration, when the amphibious vehicle A assumes a posture in which the front portion is inclined upward and the lower portion is inclined downward, the opening 15 of the second cooling source introducing portion 14 can be more reliably disposed in water for a long time and take in water continuously. As a result, the engine 1 or the like can be continuously cooled with the water-cooled type cooler 12 until the amphibious vehicle A is on land.

Also, in the amphibious vehicle A of the present embodiment, the opening 15 taking in water of the second cooling source introducing portion 14 and the inlet port 6*d* taking in water for water jet are separately disposed so that water can be taken in separately. That is, the inlet port 6*d* of the water jet channel 6*a* and the opening 15 of the second cooling source introducing portion 14 are disposed at different positions on the outer surface of the vehicle body 7, and the second cooling source introducing portion 14 is an independent passage from the water jet channel 6*a*.

Corrosion may occur in the amphibious vehicle A due to salinity of seawater when it travels on the sea. For this reason, it is necessary to clean the amphibious vehicle A by using cleaning water such as fresh water on land after traveling on the sea. In the amphibious vehicle A of the present embodiment, since the second cooling source introducing portion 14 is an independent passage from the water jet channel 6*a*, it is possible to easily supply a cleaning solution into the second cooling source introducing portion 14 without causing disturbance to the impeller 6*b* in the water jet channel 6*a*. For example, it is possible to send a jet stream of the cleaning solution to the back of the second cooling source introducing portion 14. Therefore, in the amphibious vehicle A of the present embodiment, it is possible to easily clean the inside of the second cooling source introducing portion with a cleaning solution.

Figure 4:
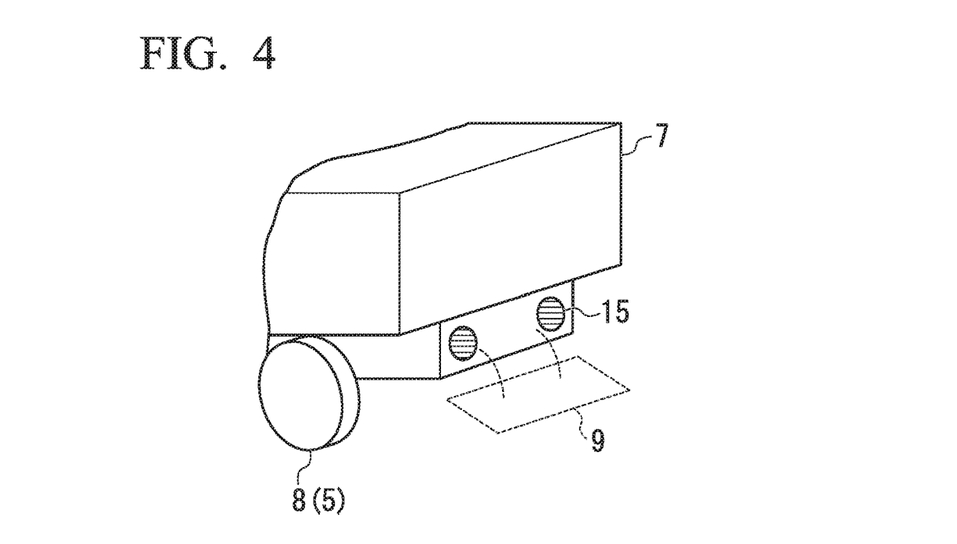
FIG. 4 is a perspective view of a rear surface portion of an amphibious vehicle of a modified example of one embodiment according to the present invention.

Furthermore, in the amphibious vehicle A of the present embodiment, it is more preferable that the opening 15 of the second cooling source introducing portion 14 be disposed to be exposed in a side view or rear view of the vehicle body 7. In other words, it is more preferable that the opening 15 of the second cooling source introducing portion 14 be formed to be open on the side surface or the rear surface of the draft portion of the vehicle body 7. Further, as shown in FIG. 4, when there is no flap 9 for adjusting the trim angle, the opening 15 of the second cooling source introducing portion 14 can be appropriately provided on the rear surface of the vehicle body 7.

With such a configuration, as described above, it is possible to continue cooling the engine 1 or the like at the time of moving to land by taking in water from the opening 15 of the second cooling source introducing portion 14. Also, during cleaning of the amphibious vehicle A with cleaning water as described above, since the opening 15 of the second cooling source introducing portion 14 is formed to be open on the side surface or the rear surface of the draft portion of the vehicle body 7, the cleaning water can be easily introduced from the opening 15 and the passage of the second cooling source introducing portion 14 can be easily cleaned.

That is, when the opening 15 of the second cooling source introducing portion 14 is formed to be open on the bottom portion of the vehicle body 7, it is difficult to introduce the cleaning water into the passage and a great deal of labor is required for the cleaning work. However, it is possible to facilitate the cleaning work by forming the opening 15 of the second cooling source introducing portion 14 on the side surface or the rear surface of the draft portion of the vehicle body 7.

While one embodiment of the amphibious vehicle according to the present invention has been described, the present invention is not limited to the above-described embodiment and can be modified appropriately without departing from the spirit and scope of the present invention.

For example, although the traveling portion 5 of the amphibious vehicle A in the present embodiment has been described as the wheel type in which tires of the drive wheels 8 are provided, as described above, the traveling portion 5 of the amphibious vehicle A according to the present invention may also be a crawler type (tracked type). Specifically, as shown in FIGS. 5 and 6, the traveling portion 5 may be configured to include idler pulleys (drive wheels) 16 (or sprockets), lower rolling wheels (driven wheels) 17 (or upper rolling wheels), and an endless crawler belt 18 wrapped around the idler pulleys 16 and the lower rolling wheels 17.

Figure 5:
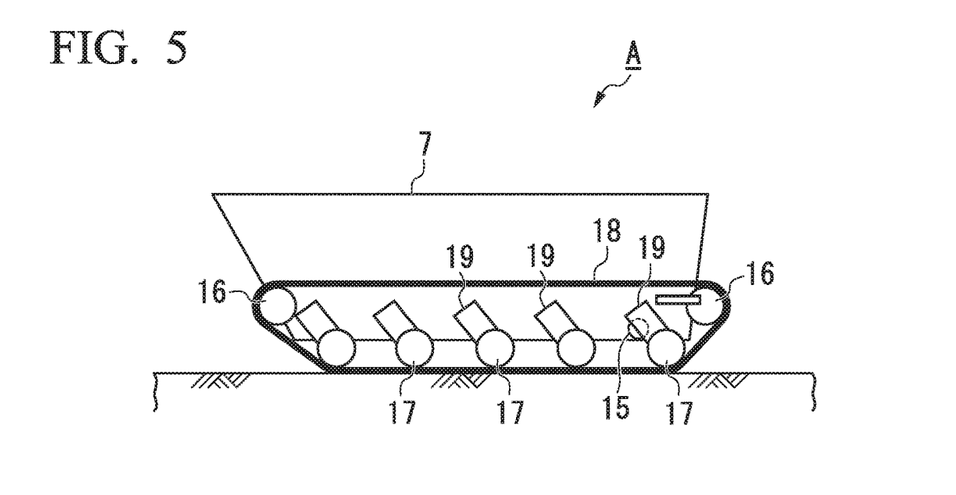
FIG. 5 is a side view of an amphibious vehicle when traveling on land in another modified example of one embodiment according to the present invention.
Figure 6:
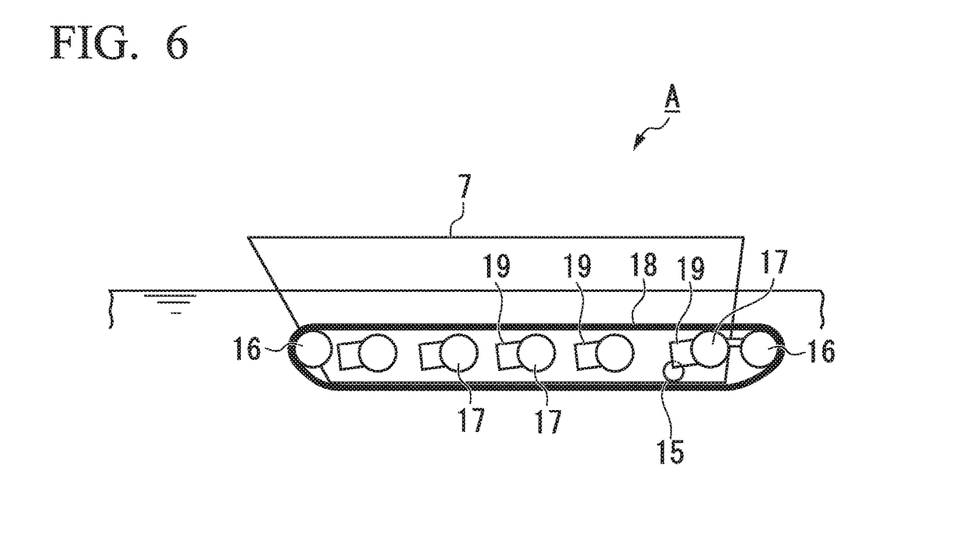
FIG. 6 is a side view of the amphibious vehicle shown in FIG. 5 when traveling on water.

Also, in the crawler type traveling portion 5, as shown in FIGS. 5 and 6, a plurality of lower rolling wheels 17 (or upper rolling wheels) may be supported by movable support arms 19 which are rotatable and/or expandable and contractible. In this case, by rotating and/or expanding and contracting the movable support arms 19, it is possible to change a position (shape) of the crawler belt appropriate for water travel, land travel, and moving to land. In addition, on land, the amphibious vehicle A can be inclined by selectively rotating and/or expanding and contracting the plurality of movable support arms 19, and a posture of the amphibious vehicle A can be freely operated.

When the crawler type traveling portion 5 is provided as described above, it may be configured such that the opening 15 of the second cooling source introducing portion 14 is opened and closed by the movable support arms 19 whose positions change at the time of traveling on water, moving to land, and traveling on land.

For example, as shown in FIGS. 5 and 6, by the movement of the movable support arms 19, the opening 15 of the second cooling source introducing portion 14 may be configured to be fully open at the time of traveling on water, the opening 15 of the second cooling source introducing portion 14 to be fully open or half open at the time of moving to land, and the opening 15 of the second cooling source introducing portion 14 to be closed at the time of traveling on land.

Specifically, the movable support arms 19 can be displaced between a first state in which the lower rolling wheels 17 in the plurality of wheels are supported at a first position in a vertical direction and a second state in which the lower rolling wheels 17 are supported in a second position in a vertical direction. The relative position of the lower rolling wheels 17 with respect to the vehicle body 7 in the second position is on an upper side of the lower rolling wheels 17 in the first position. The first state in which the movable support arms 19 support the lower rolling wheels 17 in the first position is executed, for example, at the time of traveling on land shown in FIG. 5. In addition, the second state in which the movable support arms support the lower rolling wheels 17 in the second position is executed, for example, at the time of traveling on water shown in FIG. 6. The opening 15 of the second cooling source introducing portion 14 is disposed at a position which is closed by the movable support arms 19 when the movable support arms 19 are in the first state as shown in FIG. 5, and disposed at a position which is not closed by the movable support arms 19 when the movable support arms 19 are in the second state as shown in FIG. 6.

As described above, since the movable support arms 19 close the opening 15 of the second cooling source introducing portion 14 at the time of traveling on land, even when the opening 15 of the second cooling source introducing portion 14 is formed to be open on the side surface and the rear surface of the vehicle body 7, it is possible to prevent foreign matter such as earth and sand from being introduced into the inside from the opening 15. Since the movable support arms 19 open the opening 15 of the second cooling source introducing portion 14 at the time of traveling on water and moving to land, it is possible to take in water from the opening 15 of the second cooling source introducing portion 14 and appropriately cool the engine 1 or the like.

Further, in a state in which the opening 15 of the second cooling source introducing portion 14 is closed by the movable support arms 19 in the present embodiment, not only a state in which foreign matter such as earth and sand does not enter the opening 15 due to the movable support arms 19 but also a state in which it cannot easily enter the opening 15 is included, and thereby, for example, there may be a gap between the movable support arms 19 and the opening 15.

INDUSTRIAL APPLICABILITY

According to one aspect of the present invention, a power portion can be stably cooled.

REFERENCE SIGNS LIST

1 Engine (power portion)
2 Transmission
3 Power distribution mechanism
4 Differential device
5 Traveling portion
6 Propulsion portion
6a Water jet channel
6b Impeller
6c Propelling shaft
6d Inlet port
6e Ejection port
7 Vehicle body
8 Drive wheel (or simply wheel)
9 Flap
10 Cooling portion
11 Air-cooled type cooler
12 Water-cooled type cooler
13 First cooling source introducing portion
14 Second cooling source introducing portion
15 Opening of second cooling source introducing portion (intake port)
16 Idler pulley (drive wheel)
17 Lower rolling wheel (driven wheel)
18 Crawler belt
19 Movable support arm
A Amphibious vehicle

The invention claimed is:

1. An amphibious vehicle comprising:
a vehicle body;
a traveling portion which causes the vehicle body to travel on land;
a propulsion portion which generates a propulsive force in water and causes the vehicle body to travel on water;
a power portion which provides power to the traveling portion and the propulsion portion; and
a cooling portion which cools at least the power portion, wherein:
the cooling portion includes a first cooling source introducing portion which takes in air from the outside as a cooling source and a second cooling source introducing portion which takes in water from the outside as a cooling source,
the second cooling source introducing portion includes an opening which takes in water and the opening is disposed to be exposed in a side view of the vehicle body and opens on a rear side of a center of gravity of the entire vehicle body and in a draft portion in an outer surface of the vehicle body,
the propulsion portion is a water jet mechanism which generates a water jet as a propulsive force,
the water jet mechanism includes a water jet channel through which water flows and an impeller disposed in the water jet channel and configured to rotate with power from the power portion,
the water jet channel includes an inlet port which takes in water from the outside, and
the inlet port of the water jet channel and the opening of the second cooling source introducing portion are disposed at different positions in an outer surface of the vehicle body and the second cooling source introducing portion is an independent passage from the water jet channel.

2. The amphibious vehicle according to claim 1, wherein the opening of the second cooling source introducing portion is provided in a range of the rearmost ¼ of the entire length direction of the vehicle body.

3. The amphibious vehicle according to claim 1, wherein:
the traveling portion includes a plurality of wheels including a rearmost wheel; and
the opening of the second cooling source introducing portion is disposed on a rear side of the rearmost wheel.

4. The amphibious vehicle according to claim 1, wherein:
the traveling portion includes a plurality of wheels having a drive wheel and a driven wheel, a crawler belt wound around the plurality of wheels, and a movable support arm which supports at least a part of the plurality of wheels to be movable in a vertical direction;
the movable support arm is displaceable between a first state in which at least a part of the wheels is supported in a first position in a vertical direction and a second state in which at least a part of the wheels is supported in a second position which is on an upper side relative to the first position with respect to the vehicle body; and
the opening of the second cooling source introducing portion is disposed at a position which is closed by the movable support arm when the movable support arm is in the first state and at a position which is not closed by the movable support arm when the movable support arm is in the second state.

5. An amphibious vehicle comprising:
a vehicle body;
a traveling portion which causes the vehicle body to travel on land;
a propulsion portion which generates a propulsive force in water and causes the vehicle body to travel on water;

a power portion which provides power to the traveling portion and the propulsion portion; and a cooling portion which cools at least the power portion, wherein the cooling portion includes a first cooling source introducing portion which takes in air from the outside as a cooling source and a second cooling source introducing portion which takes in water from the outside as a cooling source;

the second cooling source introducing portion includes an opening which takes in water and the opening is open on a rear side of a center of gravity of the entire vehicle body and in a draft portion in an outer surface of the vehicle body;

the traveling portion includes a plurality of wheels having a drive wheel and a driven wheel, a crawler belt wound around the plurality of wheels, and a movable support arm which supports at least a part of the plurality of wheels to be movable in a vertical direction;

the movable support arm is displaceable between a first state in which at least a part of the wheels is supported in a first position in a vertical direction and a second state in which at least a part of the wheels is supported in a second position which is on an upper side relative to the first position with respect to the vehicle body; and the opening of the second cooling source introducing portion is disposed at a position which is closed by the movable support arm when the movable support arm is in the first state and at a position which is not closed by the movable support arm when the movable support arm is in the second state.

* * * * *